(12) United States Patent
Nieβner

(10) Patent No.: US 8,440,764 B2
(45) Date of Patent: May 14, 2013

(54) MOLDING COMPOSITION WITH REDUCED LIGHT SCATTERING

(75) Inventor: Norbert Nieβner, Friedelsheim (DE)

(73) Assignee: Styrolution GmbH (DE)

( * ) Notice: Subject to any disclaimer, the term of this patent is extended or adjusted under 35 U.S.C. 154(b) by 0 days.

(21) Appl. No.: 13/102,409

(22) Filed: May 6, 2011

(65) Prior Publication Data

US 2011/0275763 A1    Nov. 10, 2011

Related U.S. Application Data

(60) Provisional application No. 61/332,221, filed on May 7, 2010.

(51) Int. Cl.
*C08L 51/04* (2006.01)
(52) U.S. Cl.
USPC .......................................................... 525/71
(58) Field of Classification Search ............... 525/71
See application file for complete search history.

(56) References Cited

U.S. PATENT DOCUMENTS

| | | | |
|---|---|---|---|
| 2,520,959 A | 9/1950 | Powers | |
| 3,397,165 A | 8/1968 | Goodman et al. | |
| 4,224,419 A | 9/1980 | Swoboda et al. | |
| 4,634,734 A | 1/1987 | Hambrecht et al. | |
| 4,788,253 A | 11/1988 | Hambrecht et al. | |
| 4,880,875 A * | 11/1989 | Wassmuth et al. | 525/67 |
| 5,196,480 A * | 3/1993 | Seitz et al. | 525/71 |
| 6,525,172 B1 | 2/2003 | Barghoorn et al. | |
| 6,620,883 B2 | 9/2003 | Gasche et al. | |
| 6,774,167 B1 | 8/2004 | Oepen et al. | |
| 6,812,283 B2 | 11/2004 | Duijzings et al. | |
| 7,060,762 B2 | 6/2006 | Schaedler et al. | |
| 2002/0082374 A1 | 6/2002 | Schaedler et al. | |
| 2002/0111435 A1 | 8/2002 | Gasche et al. | |
| 2003/0181583 A1 | 9/2003 | Duijzings et al. | |

FOREIGN PATENT DOCUMENTS

| | | |
|---|---|---|
| CA | 953838 A1 | 8/1974 |
| DE | 1233131 B | 1/1967 |
| DE | 1258076 B | 1/1968 |
| DE | 1260135 B | 2/1968 |
| DE | 2101650 A1 | 7/1971 |
| DE | 2311129 A1 | 9/1974 |
| DE | 2826925 A1 | 1/1980 |
| DE | 3149358 A1 | 6/1983 |
| DE | 19907136 A1 | 8/2000 |
| EP | 6503 A1 | 1/1980 |
| EP | 007810 A2 | 2/1980 |
| EP | 0022200 A1 | 1/1981 |
| EP | 029613 A1 | 6/1981 |
| EP | 0450485 A2 | 10/1991 |
| EP | 643104 A2 | 3/1995 |
| EP | 1191044 A2 | 3/2002 |
| EP | 1305345 A1 | 5/2003 |
| GB | 976212 A | 11/1964 |
| GB | 1124911 A | 8/1968 |
| WO | WO-0130901 A1 | 5/2001 |
| WO | WO-02/10222 A1 | 2/2002 |
| WO | WO-02/28931 A1 | 4/2002 |
| WO | WO-2010/023114 A1 | 3/2010 |
| WO | WO-2011042405 A1 | 4/2011 |
| WO | WO-2011/054781 A1 | 5/2011 |

OTHER PUBLICATIONS

BASF, "Plastics," Customer Magazine BASF 1, 2009, p. 36.

* cited by examiner

*Primary Examiner* — Jeffrey Mullis
(74) *Attorney, Agent, or Firm* — Novak Druce Connolly Bove + Quigg LLP

(57) ABSTRACT

The present invention relates to a molding composition comprising
(A) a copolymer containing at least one α,β-unsaturated monocarbonitrile and at least one aromatic vinyl monomer,
(B) a graft rubber with an average particle size of from 100 to 280 nm, composed of at least one α,β-unsaturated monocarboxylic ester, and at least one graft shell composed of at least one aromatic vinyl monomer and of at least one α,β-unsaturated monocarbonitrile,
(C) a graft rubber with an average particle size of from 410 to 1000 nm, composed of at least one α,β-unsaturated monocarboxylic ester, and at least one graft shell composed of at least one aromatic vinyl polymer and of at least one α,β-unsaturated monocarbonitrile, and
wherein the ratio by weight of component (B) to component (C) is from 3:1 to 1:1. The invention also relates to the process of producing the molding composition and its use.

13 Claims, No Drawings

MOLDING COMPOSITION WITH REDUCED LIGHT SCATTERING

CROSS-REFERENCE TO RELATED APPLICATIONS

This application is non-provisional utility application claiming the benefit under 35 USC 119(e) of provisional application Ser. No. 61/332,221 filed May 7, 2010 which incorporated by reference.

The present invention relates to a molding composition, comprising
- (A) from 30 to 85% by weight of a copolymer comprising, as main units, at least one α,β-unsaturated monocarbonitrile in amounts of at least 30% by weight, based on the total weight of component (A), and at least one aromatic vinyl monomer, as component (A),
- (B) from 10 to 40% by weight of a graft rubber with an average particle size of from 100 to 280 nm, comprising a graft base b1, composed of at least one α,β-unsaturated monocarboxylic ester, and at least one graft shell b2, composed of at least one aromatic vinyl monomer and of at least one α,β-unsaturated monocarbonitrile, as component (B),
- (C) from 5 to 30% by weight of a graft rubber with an average particle size of from 410 to 1000 nm, comprising a graft base c1, composed of at least one α,β-unsaturated monocarboxylic ester, and at least one graft shell c2, composed of at least one aromatic vinyl polymer and of at least one α,β-unsaturated monocarbonitrile, as component (C), and
- (D) from 0 to 10% by weight of additives, as component (D), where the entirety of the amounts of components (A), (B), (C), and (D) is 100% by weight, and also to processes for producing said molding compositions, to the use of said molding compositions for producing foils, moldings, or fibers, and also to said foils, moldings, or fibers themselves.

It is known that impact-resistant, thermoplastic molding compositions can be obtained by adding, by way of example, graft rubbers to the polymers that form the matrix, where these are brittle at room temperature. The production and use of such graft rubbers is described by way of example in DE-A-12 60 135, DE-A-23 11 129, and EP 6503 A1. The impact-modifying action of the graft rubbers generally increases as the size of the rubber particles increases. Problems that can arise when small-particle graft rubbers are used are not only a relatively low level of impact modification but also a marked dependency of the toughness of the impact-modified molding compositions on the processing temperature of the molding compositions.

It is moreover known that particularly good results can be achieved from the coloring of impact-modified molding compositions based on styrene-acrylonitrile copolymers (SAN) if light-scattering is minimized in said molding compositions, and this particularly applies to butadiene- or acrylate-rubber-modified molding compositions, such as acrylonitrile-butadiene-styrene copolymers (ABS) and acrylonitrile-styrene-acrylate copolymers (ASA).

An example of a method for reducing light-scattering is a) maximizing the equalization of the refractive indices of continuous phase (SAN matrix) and disperse phase (rubber particles), and/or b) substantially reducing the particle size of the disperse phase. Variant a) can be realized inter alia by admixing with the SAN matrix of the ASA or ABS a miscible component, for example a polymethyl(meth)acrylate (PMMA), where this component reduces the refractive index of the SAN matrix. A disadvantage of said procedure is that the toughness of the molding composition decreases as PMMA content increases. Variant b) has the disadvantage that the large rubber-particle sizes usually required for ideal toughness/stiffness properties cause very severe light-scattering.

Molding compositions which have improved impact resistance while retaining the same good colorability can be obtained via admixture of a large-particle rubber component with a small-particle rubber component (bimodal rubber particles), as described by way of example in EP 6503 A1, EP 450 485 A2, EP 643 104 A2, or WO 2010/023114. However, the impact resistance achieved in those compositions, in particular the low-temperature impact resistance, is often insufficient for high stress levels. Furthermore, there is a limit to the amount of the large rubber particles that can be added to increase impact resistance, if marked impairment of colorability is to be avoided.

None of the abovementioned documents gives any kind of indication as to how the "rainbow effect" can be avoided, this being a particular type of light-scattering observable specifically in the case of opaque colors. Said effect is described inter alia in plastics—The customer magazine from BASF 1/2009, p. 36, where said effect is attributed to high shear rates acting on large rubber particles. However, there is no indication of any maximum permissible rubber-particle size that avoids said effect, but does not lead to impaired properties in terms of toughness and stiffness.

A SUMMARY OF THE INVENTION

It was therefore an object of the present invention to provide thermoplastic molding compositions which have better impact resistance and stress-cracking corrosion values, and in particular better multiaxial toughness values, especially at low temperatures, for example below 0° C., and in particular independently of processing temperature, and which exhibit reduced light-scattering, and in particular no rainbow effect at all, when colored, specifically with opaque colors, preferably dark color shades.

The molding composition mentioned in the introduction has accordingly been found, and it is essential to the invention here that the ratio by weight of component (B) to component (C) is in the range from 3:1 to 1:1, and that the content of the α,β-unsaturated monocarbonitrile in component (B), in % by weight based on the total weight of the graft shell b2, and in component (C), in % by weight based on the total weight of the graft shell c2, is in each case from 5 to 10% points below the content of α,β-unsaturated monocarbonitrile in component (A), in % by weight based on the total weight of component (A).

Processes for producing said molding composition have moreover been found, as also have the use of said molding composition for producing foils, moldings, or fibers, and these foils, moldings, or fibers themselves.

When the molding compositions of the invention are compared with known molding compositions, they have better impact resistance and stress-cracking corrosion values, and in particular better multiaxial toughness values, especially at low temperatures, for example below 0° C., and preferably independently of processing temperature, and when colored, specifically with opaque colors, preferably dark color shades, they exhibit reduced light-scattering, and in particular no rainbow effect at all.

A DETAILED DESCRIPTION OF THE INVENTION

The articles, processes, and uses of the invention are described below.

The term molding composition hereinafter means a mixture comprising components (A), (B), (C), and optionally further additives (D).

Component (A):

The molding composition of the invention comprises, as component (A), from 30 to 85% by weight, preferably from 40 to 77% by weight, particularly preferably from 50 to 70% by weight, based in each case on the total weight of components (A) to (D), of a copolymer comprising at least one α,β-unsaturated monocarbonitrile and at least one aromatic vinyl monomer.

In the molding composition of the invention, component (A) is the matrix-forming hard component, i.e. component (A) has a higher degree of hardness than components (B) and (C).

Suitable α,β-unsaturated monocarbonitriles are those selected from the group consisting of acrylonitrile, methacrylonitrile, and mixture thereof.

Compounds of the general (I) can be used as suitable aromatic vinyl monomers in component (A)

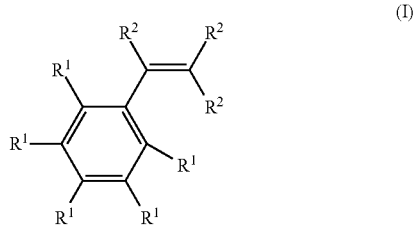

(I)

where

R$^1$, independently of one another, are hydrogen, C$_1$-C$_{10}$-alkyl, C$_1$-C$_{10}$-cycloalkyl, C$_1$-C$_{10}$-alkoxy, C$_6$-C$_{18}$-alkyl, C$_6$-C$_{18}$-aralkyl, C$_6$-C$_{18}$-aryloxy, chlorine, or bromine, and R$^2$, independently of one another, are hydrogen, C$_1$-C$_{10}$-alkyl, chlorine, or bromine.

Preferred aromatic vinyl monomers of the general formula (I) are those selected from the group consisting of styrene, 3-methylstyrene, 3,5-dimethylstyrene, 4-n-propylstyrene, α-methylstyrene, α-methylvinyltoluene, α-chlorostyrene, α-bromostyrene, dichlorostyrene, dibromostyrene, and mixtures thereof. Particularly preferred aromatic vinyl monomers are styrene and/or α-methylstyrene.

Component (A) can be obtained by any of the methods known to the person skilled in the art, an example being free-radical anionic or cationic polymerization. It is preferable to obtain component (A) via continuous or noncontinuous bulk or solution polymerization. In one preferred embodiment, the polymerization solution comprises, as solvent, from 0 to 20% by weight of an aromatic solvent, such as toluene, xylenes, or ethylbenzene. Component (A) can be obtained by a process described by way of example in Kunststoff-Handbuch [Plastics Handbook], Vieweg-Daumiller, volume V, (Polystyrol) [Polystyrene], Carl-Hanser-Verlag, Munich 1969, pp. 122 ff. Hard component (A) is also available commercially.

In one preferred embodiment, component (A) comprises acrylonitrile as α,β-unsaturated monocarbonitrile, and styrene and/or α-methylstyrene as aromatic vinyl monomer.

In one particularly preferred embodiment, component (A) of the molding composition of the invention is therefore an SAN or an AMSAN copolymer, or a styrene-α-methylstyrene-acrylonitrile copolymer (SAMSAN), which is composed of acrylonitrile and α-methylstyrene and optionally styrene. The proportion of acrylonitrile present in said SAN or AMSAN of SAMSAN copolymer is from 30 to 40% by weight, preferably from 30 to 35% by weight, and the proportion of styrene or α-methylstyrene present in said copolymer is from 60 to 70% by weight, preferably from 65 to 70% by weight, where the entirety of the amounts of the monomers mentioned is 100% by weight.

The weight-average molar mass M$_w$ of the polymer used as component (A) is preferably from 50 000 to 250 000 g/mol, particularly preferably from 90 000 to 200 000 g/mol, in each case measured via GPC using UV detection (against polystyrene calibration standards, using a 5*MixedB column).

The number-average molar mass M$_n$ of the polymer used as component (A) is preferably from 20 000 to 100 000 g/mol, particularly preferably from 30 000 to 80 000 g/mol, in each case measured via GPC using UV detection.

Hard component (A) is commercially available by way of example with trademark Luran® from BASF SE.

Component (B):

Component (B) in the molding composition of the invention is a graft rubber with an average particle size of from 100 to 280 nm, preferably from 100 to 250 nm, particularly preferably from 100 to 200 nm, comprising a graft base b1 composed of at least one α,β-unsaturated monocarboxylic ester and at least one graft shell b2 composed of at least one aromatic vinyl monomer and of at least one α,β-unsaturated monocarbonitrile.

The molding composition of the invention comprises, as component (B), from 10 to 40% by weight, preferably from 15 to 35% by weight, particularly preferably from 20 to 30% by weight, based in each case on the total weight of components (A) to (D), of a graft rubber which has a graft base b1 and at least one graft shell b2.

The α,β-unsaturated monocarboxylic ester derives from an α,β-unsaturated monocarboxylic acid selected from the group consisting of methacrylic acid, acrylic acid, and mixtures thereof. To obtain the α,β-unsaturated monocarboxylic ester, the α,β-unsaturated monocarboxylic acid mentioned is reacted with an alcohol. Said alcohol is a saturated or unsaturated aliphatic alcohol having from 1 to 12 carbon atoms. In one preferred embodiment, said alcohol has from 1 to 8 carbon atoms, particularly preferably from 2 to 6 carbon atoms. The alcohol component of the α,β-unsaturated monocarboxylic ester here can be of linear or branched structure. In one preferred embodiment, the alcohol radical of the ester is of linear structure. Particularly suitable C$_1$-C$_{12}$-alkyl acrylates are ethyl acrylate, 2-ethylhexyl acrylate, and n-butyl acrylate. Preference is given to 2-ethylhexyl acrylate and n-butyl acrylate, and very particular preference is given to n-butyl acrylate. It is also possible to use a mixture of various alkyl acrylates differing in their alkyl radical.

In one particularly preferred embodiment, the α,β-unsaturated monocarboxylic ester is n-butyl acrylate. In one preferred embodiment, the graft base b1 is therefore a polybutyl acrylate. In another preferred embodiment, the polybutyl acrylate used as graft base b1 has been crosslinked. Said crosslinking can be carried out by any of the processes known to the person skilled in the art, for example via addition of crosslinking monomers. Such monomers are bi- or polyfunctional comonomers having at least two olefinic double bonds, examples being butadiene and isoprene, divinyl esters of dicarboxylic acids, for example of succinic acid and of adipic acid, diallyl and divinyl ethers of bifunctional alcohols, for example of ethylene glycol and of butane-1,4-diol, diesters of acrylic acid and methacrylic acid with the bifunctional alcohols mentioned, 1,4-divinylbenzene, and triallyl cyanurate. Particular preference is given to the acrylic ester of tricyclodecenyl alcohol (see DE-A 12 60 135), which is known as dihydrodicyclopentadienyl acrylate (DCPA), and also to the allyl esters of acrylic and methacrylic acid.

In one preferred embodiment, the swelling index of the graft base b1 used in component (B) is from 5 to 35, particularly preferably from 10 to 18, and very particularly preferably from 12 to 16. The swelling index is a measure of the ability of a solvent to swell a polymer. An example of a conventional swelling agent is methyl ethyl ketone or toluene. By way of example, the swelling index is determined by a method in which about 0.2 g of the solid in a graft-base dispersion converted to a film via evaporation of the water is swollen in an amount of toluene, e.g. 50 g. The toluene is removed by suction after, for example, 24 hours, and the specimen is weighed. The specimen is again weighed after it has been dried in vacuo. The swelling index is the ratio of the weight after the swelling procedure to the dry weight after final drying.

In another preferred embodiment, the gel content of the graft base b1 used in component (B) is more than 80%, preferably more than 90%, particularly preferably more than 94%. The gel content is that content of the product that has been crosslinked, therefore being insoluble in a solvent. The solvent in which gel content is determined is preferably the same as that used for the swelling index. Gel content is calculated from the ratio of the dry weight after the swelling step to the weight prior to the swelling step (×100%).

The average particle size of the graft base b1 present in component (B) is generally from 50 to 170 nm, preferably from 60 to 150 nm, particularly preferably from 70 to 130 nm. All of the average particle sizes mentioned for the purposes of this application are the $d_{50}$ (weight) average particle diameters, and are determined with the aid of an ultracentrifuge, using the method of W. Scholtan and H. Lange, Kolloid-Z. and Z. Polymere 250 (1972), 782-796. The ultracentrifuge measurement gives the cumulative mass distribution of the particles in a specimen. The $d_{50}$ average particle diameter is defined as the diameter that is greater than that of 50% by weight of the particles and smaller than that of 50% by weight of the particles.

Within the graft rubber used as component (B) there is moreover at least one graft shell b2 present, composed of at least one aromatic vinyl monomer and of at least one α,β-unsaturated monocarbonitrile. In one preferred embodiment, the at least one aromatic vinyl monomer in the graft shell b2 also corresponds to compounds of the general formula (I), with the definitions stated there for $R^1$ and $R^2$. In one particularly preferred embodiment, the at least one aromatic vinyl monomer in the graft shell b2 has been selected from styrene, α-methylstyrene, and mixtures thereof.

In one preferred embodiment, the α,β-unsaturated monocarbonitrile comprised within the graft shell b2 has been selected from acrylonitrile or methacrylonitrile or a mixture thereof. It is preferable to use acrylonitrile.

The ratio of aromatic vinyl polymer to α,β-unsaturated monocarbonitrile in the graft shell b2 is preferably from 5:1 to 1:1, particularly preferably from 4:1 to 2:1, very particularly preferably from 3.5:1 to 2.5:1.

The amount of the graft base b1 present in component (B) is from 40 to 80% by weight, preferably from 50 to 70% by weight, and particularly preferably 60% by weight, based on component (B). In one preferred embodiment, the amount of the graft shell b2 is from 20 to 60% by weight, preferably from 30 to 50% by weight, particularly preferably 40% by weight, based in each case on component (B). The amounts of graft base b1 and graft shell b2 always give a total of 100% by weight.

In one very particularly preferred embodiment, component (B) therefore uses a graft rubber which has a crosslinked polybutyl acrylate as graft base b1 and a copolymer of styrene and acrylonitrile as graft shell b2. The graft shell b2 here can have been to some extent or else completely grafted onto the graft base b1.

Processes for producing a graft rubber present as component (B) in the molding composition of the invention are known to the person skilled in the art.

To produce the graft polymer (B) it is preferable to use potassium peroxodisulfate as free-radical initiator. It is also possible to use sodium peroxodisulfate and/or ammonium peroxodisulfate. It is also possible to use a redox initiator system, in particular comprising an organic peroxide and at least one reducing agent.

Suitable organic peroxides are those selected from the following group: di-tert-butyl peroxide, cumene hydroperoxide, tert-butyl hydroperoxide, and p-menthane hydroperoxide, and mixtures thereof. The reducing agent used generally comprises at least one water-soluble compound which has reducing action and has been selected from the following group: salts of sulfinic acid, salts of sulfurous acid, sodium dithionite, sodium sulfite, sodium hyposulfite, sodium hydrogensulfite, ascorbic acid, and salts thereof, Rongalit C (sodium formaldehyde-sulfoxylate), mono- and dihydroxyacetone, sugars, iron(II) salts, tin(II) salts, and titanium(III) salts.

The amount of the free-radical initiator used, based on the total amount of monomer, is generally from 0.01 to 5% by weight, preferably from 0.1 to 3% by weight, and particularly preferably from 0.2 to 1.5% by weight.

Examples of suitable production processes for the graft copolymers (B) are emulsion polymerization, solution polymerization, suspension polymerization, and bulk polymerization, and the graft copolymers (B) here are preferably produced via aqueous free-radical emulsion polymerization. Suitable polymerization processes are described inter alia in WO-A 2002/10222, DE-A 28 26 925, and also in EP-A 022 200.

The graft polymer (B) can be produced by emulsion polymerization, with use of a redox initiator system comprising cumene hydroperoxide, dextrose, and iron(III) salt, or with use of a peroxide, such as potassium peroxodisulfate.

The graft base b1 can by way of example be produced via free-radical-initiated aqueous emulsion polymerization, by using a portion of the monomers as initial charge in an aqueous reaction medium, and adding any optionally remaining amount of monomers within the aqueous reaction medium after initiation of the free-radical polymerization reaction. In another possible method, at least one portion of the free-radical polymerization initiator and optionally of other auxiliaries is used as initial charge in the aqueous reaction medium, the resultant aqueous reaction medium is brought to polymerization temperature, and, at that temperature, the monomers are added to the aqueous reaction medium. The materials can also be introduced here in the form of a mixture, for example in the form of aqueous monomer emulsion.

In one preferred embodiment of the invention, a peroxodisulfate, in particular potassium peroxodisulfate (PPS), is used as free-radical initiator, in conjunction with other auxiliary components, when producing the graft base b1. It is possible inter alia to use a buffer (such as bicarbonate), and potassium stearate or K30® as soap.

By way of example, tert-dodecyl mercaptan (TDM) can be used as molecular-weight regulator (MR), and can be added continuously or else at various junctures during the process to produce the rubber latex.

The manner of addition of the regulator can have an effect on the properties of the final product. One preferred embodiment uses no regulator.

For the purposes of the polymerization process described, dispersing agents (DM) are also used, and these maintain dispersion not only of the monomer droplets but also of the polymer particles formed, within the aqueous medium, and thus ensure that the resultant aqueous polymer dispersion is stable. Dispersing agents (DM) that can be used are not only the protective colloids conventionally used in carrying out free-radical aqueous emulsion polymerizations but also commercially available emulsifiers. Examples of suitable protective colloids are polyvinyl alcohols, polyalkylene glycols, alkali metal salts of polyacrylic acids and polymethacrylic acids, and gelatin derivatives. Examples of suitable protective colloids are copolymers comprising the following: acrylic acid, methacrylic acid, maleic anhydride, 2-acrylamido-2-methylpropanesulfonic acid, and/or 4-styrenesulfonic acid, and alkali metal salts of those copolymers.

Other suitable protective colloids are homo- and copolymers comprising the following: N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, aminated acrylates, methacrylates, acrylamides, and/or methacrylamides. There is also a detailed description of other suitable protective colloids in Houben-Weyl, "Methoden der organischen Chemie" [Methods of Organic Chemistry], volume XIV/1, Makromolekulare Stoffe [Macromolecular materials], Georg-Thieme-Verlag, Stuttgart, 1961, pages 411 to 420.

It is also possible to use mixtures of protective colloids and/or emulsifiers. The dispersing agents used frequently comprise exclusively emulsifiers, where the relative molecular weights of these, unlike those of the protective colloids, are usually below 1000. They can be either anionic, cationic, or nonionic. If a mixture of surfactant substances is used, the individual components should be mutually compatible. Anionic emulsifiers are generally compatible with one another and with nonionic emulsifiers.

The same also applies to cationic emulsifiers, whereas anionic and cationic emulsifiers should mostly not be combined with one another. An overview of suitable emulsifiers is found in Houben-Weyl, "Methoden der organischen Chemie", volume XIV/1, Makromolekulare Stoffe, Georg-Thieme-Verlag, Stuttgart, 1961, pages 192 to 208. Particular dispersing agents used in the invention are emulsifiers, such as anionic, cationic, or nonionic surfactants. Examples of familiar nonionic emulsifiers are oxylated mono-, di- and trialkylphenols, and also ethoxylated fatty alcohols. Examples of conventional anionic emulsifiers are the alkali metal and ammonium salts of alkyl sulfates (having $C_8$-$C_{12}$-alkyl radicals), of sulfuric acid hemiesters of ethoxylated alkanols (alkyl radical: $C_{12}$-$C_{18}$), and of ethoxylated alkylphenols (alkyl radicals: $C_4$-$C_{12}$), and of alkylsulfonic acids (alkyl radical: $C_{12}$-$C_{18}$).

Suitable cationic emulsifiers are inter alia phosphonium salts, sulfonium salts, tropylium salts, morpholinium salts, oxazolinium salts, imidazolinium salts, pyridinium salts, and primary, secondary, tertiary, or quaternary ammonium salts having $C_8$-$C_{18}$-alkyl, alkylaryl, or heterocyclic radicals. Examples of compounds are inter alia N-laurylpyridinium sulfate, N-cetylpyridinium sulfate, dodecylammonium acetate or the corresponding sulfate, and disulfates or acetates of the various paraffinic esters that involve 2-(N,N,N-trimethylammonium)ethyl radicals. The emulsifiers and protective colloids can also be used in the form of mixtures.

The total amount used of the emulsifiers preferred for use as dispersing agents is advantageously from 0.005 to 5% by weight, preferably from 0.01 to 5% by weight, in particular from 0.1 to 3% by weight, based in each case on the total concentration of monomer. The total amount of the protective colloids used as dispersing agents in addition to or instead of the emulsifiers is often from 0.1 to 10% by weight, and frequently from 0.2 to 7% by weight, based in each case on the total monomer concentration. However, the dispersing agents used preferably comprise anionic and/or nonionic emulsifiers and particularly preferably comprise anionic emulsifiers.

Other polymerization auxiliaries that can be used during the polymerization reaction are the conventional buffer substances (BS), which can adjust to pH values which are preferably from 6 to 11, examples being sodium bicarbonate and sodium pyrophosphate, and also from 0 to 3% by weight of a molecular-weight regulator (MR), e.g. mercaptans, terpineols, or dimeric α-methylstyrene. The buffer substances can also have a complexing action.

The polymerization reaction can be carried out in the range from 0 to 170° C. Temperatures used are generally from 40 to 120° C., frequently from 50 to 110° C., and often from 60 to 100° C.

The free-radical-initiated aqueous emulsion polymerization can also optionally be carried out in the presence of a polymer seed, for example in the presence of from 0.01 to 3% by weight, frequently from 0.03 to 2% by weight, and often from 0.04 to 1.5% by weight, of a polymer seed, based in each case on the total amount of monomer. A polymer seed can in particular be used when, as described in U.S. Pat. No. 2,520,959 and U.S. Pat. No. 3,397,165, the intention is to achieve controlled setting of the particle size of the polymer particles to be produced by means of free-radical-initiated aqueous emulsion polymerization.

The polymers (b1) produced in the manner described above are suitable as graft base for producing the graft copolymers (B).

An important parameter for graft copolymers is the graft yield, which is 100% in the case of complete grafting. Graft copolymers with maximum graft yield are advantageous for many applications, since these comprise only small amounts of free polymer derived from the monomers. The polymer not bound to the rubber can have an adverse effect on the physical properties of the copolymer, and this is particularly noticeable in mixtures with other components.

The graft shell (b2) is produced via an emulsion polymerization process, optionally after agglomeration. In one embodiment of the invention, the graft shell (b2) is polymerized in the presence of the graft core (b1) obtained by the process described above from a monomer mixture comprising the following components: styrene, acrylonitrile, and optionally further monomers. The monomers here (and optionally further monomers) can be added individually or in mixtures with one another. By way of example, it is possible to begin by adding styrene alone and then to graft, onto the material, a mixture of styrene and acrylonitrile. It is advantageous that this graft copolymerization reaction is again carried out in aqueous emulsion, under the conventional conditions described above, and the use of a redox initiator system has proven successful here.

The system in which the graft copolymerization reaction takes place to produce the graft shell (b2) can be the same as that used for the emulsion polymerization reaction to produce the graft base (b1), and it is possible here, if necessary, to add further emulsifiers, and also auxiliaries. The monomer mixture which in one embodiment of the invention is to be grafted onto the material can be added to the reaction mixture all at once, or distributed over a number of stages—for example in order to construct a plurality of grafts—or continuously during the polymerization reaction. The monomers (in particular styrene and acrylonitrile) can preferably be added simultaneously.

The degree of grafting (DG) is the amount of the graft monomers used (for example amount of styrene plus amount of acrylonitrile) divided by the sum of the amount of graft base (e.g. amount of $\alpha,\beta$-unsaturated monocarboxylic ester) and the amount of the graft monomers used.

The graft copolymerization of the mixture of components present in the graft shell and optionally of further monomers, in the presence of the graft base (b1) is carried out in such a way as to give a degree of grafting of from 10 to 70% by weight, preferably from 20 to 60% by weight, in particular from 30 to 55% by weight. Since the graft yield (GY) is generally not 100%, the portion of the polymers actually grafted onto the material is smaller than the amount used. It follows from this that some free polymers are produced. One of the possible ways of controlling the graft yield during the graft polymerization reaction uses the metering rate of the monomers, or uses variables relatilng to the addition of initiator and of regulator. By way of example, addition of a larger amount of regulator (e.g. mercaptans) leads to a larger amount of free polymers.

The graft polymerization reaction can also be initiated by using graft-active and water-soluble redox systems. By way of example, conventional water-soluble initiators, e.g. potassium peroxodisulfate, sodium peroxodisulfate, ammonium peroxodisulfate, or hydrogen peroxide can be used together with at least one conventional reducing agent, e.g. sodium sulfite, sodium disulfite, sodium hydrogensulfite, sodium dithionite, ascorbic acid, sugar, or the sodium salt of hydroxymethanesulfonic acid, as redox system. In many instances, these redox systems give relatively large-particle dispersions. Particularly suitable redox catalysts with high graft activity are water-soluble initiator systems, e.g. redox systems made of hydrogen peroxide and heavy-metal ions, examples being the cerium salts, manganese salts, and iron (II) salts, as described by way of example in Houben-Weyl, "Methoden der organischen Chemie", 4th edition, volume E 20, p. 2168. Potassium peroxodisulfate is particularly suitable.

The conduct of the polymerization reaction can be such that the heavy-metal salt of the redox system, e.g. the iron(II) salt, is added to the mixture before the polymerization reaction begins, whereas the peroxide is metered in simultaneously with the monomers, but separately therefrom. Examples of concentrations used for the iron(II) salt are from 1 to 200 mg/l of Fe(II) ions, based on the entire dispersion, but higher and lower concentrations are also possible here.

There are various ways of introducing the redox initiator system, an example being addition in portions, as described in WO 2001/30901 or WO 2002/28931. The oxidant used preferably comprises cumene hydroperoxide (optionally in a mixture with cumene), where this is in particular introduced to some extent continuously and to some extent in portioned form (e.g. once).

Conventional initiators, such as oil-soluble or sparingly water-soluble organic peroxides or azo initiators can be used in addition to the redox initiators. By way of example, it is advantageous to add further reducing agents, these preferably being used as initial charge with the iron salt prior to the polymerization reaction. Examples of reducing agents that can be used are sodium sulfite, sodium disulfite, sodium hydrogensulfite, sodium dithionite, ascorbic acid, reducing sugars, and also the sodium salt of hydroxymethanesulfonic acid.

The molecular weight of the grafted-on polymer can also be adjusted via concomitant use of chain-transfer agents or of molecular-weight regulators (MR), e.g. n-dodecyl mercaptan, tert-dodecyl mercaptan, n-butyl mercaptan, or tert-butyl mercaptan. Odor-free regulators are also suitable, an example being terpineols, see also EP-A 1 191 044.

The polymerization reaction is frequently carried out at pH values of from 2.5 to 12, preferably at pH values of from 8 to 11. The pH value can be adjusted to the desired value prior to or during the polymerization reaction by using conventional acids, such as hydrochloric acid, sulfuric acid, or acetic acid, or else by using bases, such as sodium hydroxide solution, potassium hydroxide solution, ammonia, or ammonium carbonate. It is preferable to adjust the pH value of the aqueous polymer dispersion to from 7 to 11 after the polymerization reaction, via addition of sodium hydroxide solution, potassium hydroxide solution, or ammonia.

Between production of the graft base (b1) and application of the graft shell (b2), an agglomeration step can be carried out, in order to achieve controlled setting of particle sizes and particle size distributions. Various processes for partial or complete agglomeration of the graft base (b1) are known to the person skilled in the art, see by way of example EP-A 1 305 345, EP-A 029 613, EP-A 007 810, DE-A 12 33 131, DE-A 12 58 076 and DE-A 21 01 650. The agglomeration process can also be undertaken by other methods known to the person skilled in the art. These can have a considerable effect on the quality of the molding compositions and on the costs of the entire process.

It is also possible in principle to use physical agglomeration processes, such as shear coagulation, freeze-agglomeration processes, or pressure-agglomeration processes, but the methods generally used are chemical. The latter also include addition of electrolytes, such as magnesium sulfate, or of inorganic or organic acids.

In the second stage, the rubber latex can be agglomerated. This is generally achieved via addition of a dispersion of an acrylate polymer. It is preferable to use dispersions of copolymers of $C_1$-$C_4$-alkyl acrylates, preferably of ethyl acrylate, with from 0.1 to 10% by weight of monomers that form polar polymers, e.g. acrylic acid, methacrylic acid, acrylamide, or methacrylamide, N-methylolmethacrylamide, or N-vinylpyrrolidone. It is preferable to use a copolymer of from 90 to 96% by weight of ethyl acrylate and from 4 to 10% by weight of methacrylamide. The agglomeration dispersion can also optionally comprise a plurality of the acrylate polymers mentioned. The concentration of the acrylate polymers in the dispersion used for the agglomeration process is generally intended to be from 3 to 40% by weight.

The agglomeration process generally uses from 0.2 to 20 parts by weight, preferably from 1 to 5 parts by weight, of the agglomeration dispersion, for every 100 parts of the rubber latex, where the calculation is always based on solids. The agglomeration process is carried out by adding the agglomeration dispersion to the rubber. The addition rate can be varied, but addition usually takes about 1 to 60 minutes, at a temperature of from 20° to 90° C., preferably from 30° to 75° C.

In principle, the rubber latex can be agglomerated not only by means of an acrylate polymer dispersion but also via other means of agglomeration, e.g. acetic anhydride. It is also possible to carry out pressure- or freeze-agglomeration, but these are less advantageous processes. The methods mentioned have been known for some time to the person skilled in the art.

However, the conditions described hitherto frequently result in agglomeration of only a portion of the rubber particles, the resultant distribution therefore being bi- or polymodal.

The percentage of the particles (number distribution) present in the agglomerated state after the agglomeration process is generally more than 40, preferably from 51 to 70. The partially agglomerated rubber latex obtained is relatively stable, and can therefore be readily stored and transported without coagulation.

A component which is particularly suitable for agglomerating rubber particles serving as graft base is a copolymerizable, polyfunctional, agglomerating component which comprises at least one copolymer of $C_1$-$C_{12}$-alkyl acrylates or $C_1$-$C_{12}$-methalkyl acrylates and of polar comonomers from the group of acrylamide, methylacrylamide, ethylacrylamide, n-butylacrylamide, or maleamide.

Examples of known agglomeration polymers are polyethylene oxide polymers, polyvinyl ethers, or polyvinyl alcohol. Other suitable agglomeration polymers are copolymers which comprise comonomers other than the polar comonomers listed above. Among the particularly suitable agglomeration polymers are in particular the copolymers of $C_1$-$C_{12}$-alkyl acrylates or $C_1$-$C_{12}$-methalkyl acrylates and of polar comonomers from the group of acrylamide, methacrylamide, ethacrylamide, n-butylacrylamide, or maleamide, see also EP-A 1 305 345.

In one preferred embodiment of the present invention, no agglomeration step is carried out.

It is essential to the invention that the content of the α,β-unsaturated monocarbonitrile in component (B), in % by weight based on the total weight of the graft shell b2, is from 5 to 10 percentage points below the content of α,β-unsaturated monocarbonitrile of component (A), in % by weight based on the total weight of component (A).

Component (C):

Component (C) in the molding composition of the invention is a graft rubber with an average particle size of from 410 to 1000 nm, preferably from 410 to 800 nm, particularly preferably from 410 to 600 nm, comprising a graft base c1, composed of at least one α,β-unsaturated monocarboxylic ester, and at least one graft shell c2, composed of at least one aromatic vinyl monomer and of at least one α,β-unsaturated monocarbonitrile.

The molding composition of the invention comprises, as component (C), from 5 to 30% by weight, preferably from 8 to 25% by weight, particularly preferably from 10 to 20% by weight, based in each case on the total weight of components (A) to (D), of a graft rubber which has a graft base c1 and at least one graft shell c2.

The α,β-unsaturated monocarboxylic ester derives from an α,β-unsaturated monocarboxylic acid selected from the group consisting of methacrylic acid, acrylic acid, and mixtures thereof. To obtain the α,β-unsaturated monocarboxylic ester, the α,β-unsaturated monocarboxylic acid mentioned is reacted with an alcohol. Said alcohol is a saturated or unsaturated aliphatic alcohol having from 1 to 12 carbon atoms. In one preferred embodiment, said alcohol has from 1 to 8 carbon atoms, particularly preferably from 2 to 6 carbon atoms. The alcohol component of the α,β-unsaturated monocarboxylic ester here can be of linear or branched structure. In one preferred embodiment, the alcohol radical of the ester is of linear structure. Particularly suitable $C_1$-$C_{12}$-alkyl acrylates are ethyl acrylate, 2-ethylhexyl acrylate, and n-butyl acrylate. Preference is given to 2-ethylhexyl acrylate and n-butyl acrylate, and very particular preference is given to n-butyl acrylate. It is also possible to use a mixture of various alkyl acrylates differing in their alkyl radical.

In one particularly preferred embodiment, the α,β-unsaturated monocarboxylic ester is butyl acrylate. In one preferred embodiment, the graft base c1 is therefore a polybutyl acrylate. In another preferred embodiment, the polybutyl acrylate used as graft base b1 has been crosslinked. Said crosslinking can be carried out by any of the processes known to the person skilled in the art, for example via addition of crosslinking monomers. Such monomers are bi- or polyfunctional comonomers having at least two olefinic double bonds, examples being butadiene and isoprene, divinyl esters of dicarboxylic acids, for example of succinic acid and of adipic acid, diallyl and divinyl ethers of bifunctional alcohols, for example of ethylene glycol and of butane-1,4-diol, diesters of acrylic acid and methacrylic acid with the bifunctional alcohols mentioned, 1,4-divinylbenzene, and triallyl cyanurate. Particular preference is given to the acrylic ester of tricyclodecenyl alcohol (see DE-A 12 60 135), which is known as dihydrodicyclopentadienyl acrylate (DCPA), and also to the allyl esters of acrylic and methacrylic acid.

In one preferred embodiment, the swelling index of the graft base c1 used in component (C) is from 5 to 25, particularly preferably from 7 to 18, and very particularly preferably from 8 to 12. The swelling index is a measure of the ability of a solvent to swell a polymer. An example of a conventional swelling agent is methyl ethyl ketone or toluene. By way of example, the swelling index is determined by a method in which about 0.2 g of the solid in a graft-base dispersion converted to a film via evaporation of the water is swollen in an amount of toluene, e.g. 50 g. The toluene is removed by suction after, for example, 24 hours, and the specimen is weighed. The specimen is again weighed after it has been dried in vacuo. The swelling index is the ratio of the weight after the swelling procedure to the dry weight after final drying.

In another preferred embodiment, the gel content of the graft base c1 used in component (C) is more than 80%, particularly more than 90%, particularly more than 94%. The gel content is that content of the product that has been crosslinked, therefore being insoluble in a particular solvent. The solvent in which gel content is determined is preferably the same as that used for the swelling index. Gel content is calculated from the ratio of the dry weight after the swelling step to the weight prior to the swelling step (×100%).

The average particle size of the graft base c1 present in component (C) is generally from 300 to 600 nm, preferably from 350 to 580 nm, particularly preferably from 370 to 560 nm.

Within the graft rubber used as component (C) there is moreover at least one graft shell c2 present, composed of at least one aromatic vinyl monomer and of at least one αβ-unsaturated monocarbonitrile. In one preferred embodiment, the at least one aromatic vinyl monomer in the graft shell c2 also corresponds to compounds of the general formula (I), with the definitions stated there for $R^1$ and $R^2$. In one particularly preferred embodiment, the at least one aromatic vinyl monomer in the graft shell c2 has been selected from styrene, α-methylstyrene, and mixtures thereof.

In one preferred embodiment, the α,β-unsaturated monocarbonitrile comprised within the graft shell c2 has been selected from acrylonitrile or methacrylonitrile or a mixture thereof. It is preferable to use acrylonitrile.

The amount of the graft base c1 present in component (C) is from 40 to 80% by weight, preferably from 50 to 70% by weight, and particularly preferably 60% by weight, based on component (C). In one preferred embodiment, the amount of the graft shell c2 is from 20 to 60% by weight, preferably from 30 to 50% by weight, particularly preferably 40% by weight, based in each case on component (C). The amounts of graft base c1 and graft shell c2 always give a total of 100% by weight.

The ratio of aromatic vinyl polymer to α,β-unsaturated monocarbonitrile in the graft shell c2 is preferably from 8:1 to 2:1, particularly preferably from 6:1 to 4:1, very particularly preferably from 5.5:1 to 4.5:1.

In one very particularly preferred embodiment, component (C) therefore uses a graft rubber which has a crosslinked polybutyl acrylate as graft base c1 and a copolymer of styrene and acrylonitrile as graft shell c2. The graft shell c2 here can have been to some extent or else completely grafted onto the graft base c1.

Processes for producing a graft rubber which is present as component (C) in the molding composition of the invention are known to the person skilled in the art and have been described above in relation to component (B) of the molding composition of the invention.

In another preferred embodiment, component (C) is obtained by using the graft base c1 as initial charge, and adding and polymerizing the monomers comprised in the graft shell. In one particularly preferred embodiment, the amount added of the aromatic vinyl polymer prior to the start of addition of the α,β-unsaturated monocarbonitrile is more than 30%, but preferably not more than 50%, based on the total amount of aromatic vinyl polymer.

In one preferred embodiment of the molding composition of the invention, the αβ-unsaturated monocarboxylic ester in components (B) and (C) is an acrylate or methacrylate respectively derived from an alcohol having from 1 to 8 carbon atoms.

In another preferred embodiment of the molding composition of the invention, the aromatic vinyl monomer in components (B) and (C) is styrene.

In another embodiment of the molding composition of the invention, the α,β-unsaturated monocarbonitrile in components (B) and (C) is acrylonitrile.

Components (A), (B), and (C) can be mixed by any of the methods known to the person skilled in the art, for example by means of extrusion or compounding.

The graft rubber (C) can be coagulated prior to the mixing process, by using the procedure described in relation to component (B) above.

The coagulated graft rubbers (B) and (C) are optionally subjected to a centrifuging step, thus lowering the water content to from 60 to 95% by weight.

In another embodiment, the wet graft rubbers (B) and (C) are dried before they are introduced into the extruder. Suitable methods for drying appropriate graft rubbers are known to the person skilled in the art. However, it is also possible to introduce the wet graft rubbers (B) and (C) directly into the extruder in order to mix them with hard component (A). In this instance, the water is removed during the extrusion step.

It is essential to the invention that the ratio by weight of component (B) to component (C) in the molding compositions of the invention is in the range from 3:1 to 1:1.

In one preferred embodiment of the molding composition of the invention, the particle size of the graft rubbers, averaged over all of the graft rubbers (B) and (C), is in the range from 280 to 320 nm, preferably in the range from 285 to 315 nm, particularly preferably in the range from 290 to 310 nm.

It is essential to the invention that the content of the α,β-unsaturated monocarbonitrile in component (C), in % by weight based on the total weight of the graft shell c2, is from 5 to 10 percentage points below the content of α,β-unsaturated monocarbonitrile of component (A), in % by weight based on the total weight of component (A).

Component (D):

The molding composition of the invention comprises, as component (D), from 0 to 10% by weight, preferably from 0 to 8% by weight, particularly preferably from 0 to 5% by weight, of additives, based in each case on the total weight of components (A) to (D).

Additives (D) that can be used are any such substances that are known to the person skilled in the art and that are conventionally used for the processing or modification of the polymers.

The following may be mentioned by way of example: dyes, pigments, colorants, antistatic agents, antioxidants, stabilizers for improving thermal stability, stabilizers for increasing resistance to light, stabilizers for increasing hydrolysis resistance and chemicals resistance, agents to counteract decomposition by heat, and in particular lubricants, these being advantageous for the production of moldings. These further additives can be metered into the material at any stage of the production process, but preferably at an early juncture, so that the stabilizing effects (or other specific effects) of the additive are utilized at an early stage. Reference is made by way of example to "Plastics Additives Handbook", ed. Gachter and Willer, 4th edition, Hanser Publ., Munich, 1996 in respect of other conventional auxiliaries and additives.

Examples of suitable pigments are titanium dioxide, phthalocyanines, ultramarine blue, iron oxides, or carbon black, and also the entire class of the organic pigments.

Examples of suitable colorants are any of those which can be used for transparent, semitransparent, or nontransparent coloring of polymers, and particularly those suitable for the coloring of styrene copolymers, selected from dyes, special-effect pigments, and other pigments.

Examples of suitable flame retardants that can be used are the halogen-containing or phosphorus-containing compounds known to the person skilled in the art, magnesium hydroxide, and also other familiar compounds, or a mixture of these.

Examples of suitable antioxidants are sterically hindered mononuclear or polynuclear phenolic antioxidants which can have various types of substitution and can also have bridging by way of substituents. Among these are not only monomeric compounds but also oligomeric compounds, the structure of which may involve a plurality of phenolic units. It is also possible to use hydroquinones and hydroquinone analogs, and substituted compounds, and also antioxidants based on tocopherols and on derivatives thereof. Mixtures of various antioxidants can also be used. In principle, it is possible to use any of the commercially available compounds or compounds suitable for styrene copolymers, e.g. Irganox®. The materials known as costabilizers, in particular phosphorus- or sulfur-containing costabilizers, can also be used concomitantly together with the phenolic antioxidants mentioned above by way of example. These P- or S-containing costabilizers are known to the person skilled in the art. Preferred heat stabilizers (antioxidants) are substituted thiophenols, such as 4,4'-thiobis(6-tert-butyl-3-methylphenol).

Examples of stabilizers suitable for countering the action of light are various substituted resorcinols, salicylates, benzotriazoles, and benzophenones. Matting agents that can be used are not only inorganic substances, such as talc, glass beads, or metal carbonates (e.g. $MgCO_3$, $CaCO_3$), but also polymer particles—in particular spherical particles with $d_{50}$ (weight-average) diameters above 1 mm—based on, for example, methyl methacrylate, styrene compounds, acrylonitrile, or a mixture of these. It is also possible to use polymers which comprise acidic and/or basic monomers incorporated into the polymer.

Examples of suitable antidrip agents are polytetrafluoroethylene (Teflon) polymers and ultrahigh-molecular-weight polystyrene (molecular weight $M_W$ above 2 000 000).

Examples that may be mentioned of fibrous or pulverulent fillers are carbon fibers or glass fibers in the form of glass textiles, glass mats, or glass-silk rovings, chopped glass, glass beads, and also wollastonite, and particularly preferably glass fibers. When glass fibers are used, these can have been equipped with a size and with an adhesion promoter, in order to improve compatibility with the components of the blend.

The glass fibers can be incorporated either in the form of short glass fibers or else in the form of continuous-filament strands (rovings).

Examples of suitable particulate fillers are carbon black, amorphous silica, magnesium carbonate (chalk), powdered quartz, mica, bentonites, talc, feldspar, or in particular calcium silicates, such as wollastonite, and kaolin.

Examples of suitable antistatic agents are amine derivative, such as N,N-bis(hydroxyalkyl)alkylamines or -alkyleneamines, polyethylene glycol esters, copolymers of ethylene oxide glycol and propylene oxide (in particular two-block or three-block copolymers of ethylene oxide blocks and propylene oxide blocks) glycol, and glycerol mono- and distearates, and also mixtures of these.

Examples of suitable stabilizers are hindered phenols, and also vitamin E, and compounds whose structure is analogous thereto, where these include butylated condensates of p-cresol and dicyclopentadiene. HALS stabilizers (hindered amine light stabilizers), benzophenones, resorcinols, salicylates, and benzotriazoles are also suitable. Examples of other suitable compounds are thiocarboxylic esters. It is also possible to use $C_6$-$C_{20}$-fatty-acid esters of thiopropionic acid, particularly the stearyl esters and lauryl esters. It is also possible to use dilauryl thiodipropionate, distearyl thiodipropionate, or a mixture of these. Examples of other additives are HALS absorbers, such as bis(2,2,6,6-tetramethyl-4-piperidyl) sebacate, or UV absorbers, such as 2H-benzotriazol-2-yl-(4-methyphenol). The amounts used of such additives are usually from 0.01 to 2% by weight (based on the entire mixture).

Suitable lubricants and mold-release agents are stearic acids, stearyl alcohol, stearic esters, amide waxes (bissteary-lamide), polyolefin waxes or in general terms higher fatty acids, derivatives thereof, and appropriate fatty acid mixtures having from 12 to 30 carbon atoms. Ethylenebisstearamide is also particularly suitable (an example being Irgawax, produced by Ciba, Switzerland). The amounts of said additives are in the range from 0.05 to 5% by weight.

Other additives that can be used are silicone oils, oligomeric isobutylene, or similar substances. If these are used, the usual amounts are from 0.001 to 3% by weight. It is also possible to use pigments, dyes, color brighteners, such as ultramarine blue, phthalocyanines, titanium dioxide, cadmium sulfides, and derivatives of perylenetetracarboxylic acid. If processing aids and stabilizers are used, examples being UV stabilizers, heat stabilizers (e.g. butylated reaction products of p-cresol and dicyclopentadiene; Wingstay L; produced by Goodyear; or else dilauryl thiodipropionate, Irganox, produced by Ciba), lubricants, and antistatic agents (e.g. ethylene oxide-propylene oxide copolymers, such as Pluronic (produced by BASF)), the usual amounts of these are from 0.01 to 5% by weight, based on the entire molding composition.

The mixing of components (A), (B), (C), and optionally (D) can take place in any known manner by any of the known methods. However, it is preferable to blend the components by mixing them together in the melt, for example by compounding, extrusion, kneading, or rolling of the components, for example at temperatures in the range from 180 to 400° C., where the components have, if necessary, been isolated beforehand from the solution or aqueous dispersion obtained during the polymerization reaction. The graft-copolymerization products obtained in aqueous dispersion can by way of example be precipitated by using magnesium sulfate. They can preferably be only partially dewatered and mixed in the form of moist crumb (for example with a residual moisture level of from 1 to 40%, in particular from 20 to 40%) with the matrix polymers, whereupon then the complete drying of the graft polymers takes place during the mixing process. The particles can also be dried as in DE-A 19907136.

The molding compositions of the invention can be processed to give foils, moldings, or fibers, where in particular these have been colored, and in particular to give cable sheathing, foils, hoses, fibers, profiles, shoe shells, shoe soles, technical moldings or moldings of any other type, consumer items, coatings, folding bellows, ear tags for animals, and/or blow moldings.

The known processes of thermoplastic processing can be used to produce said foils, moldings, or fibers from the molding compositions of the invention. In particular, production can be achieved via thermoforming, extrusion, injection-molding, calendering, blow molding, pressing, or pressure-sintering or any other type of sintering, preferably via injection molding.

When the molding compositions of the invention are compared with known molding compositions, they have better impact resistance and stress-cracking corrosion values, and in particular better multiaxial toughness values, especially at low temperatures, for example below 0° C., and preferably independently of processing temperature, and when colored, specifically with opaque colors, preferably dark color shades, they exhibit reduced light-scattering, and in particular no rainbow effect at all.

Further explanation of the invention is provided by the examples below.

EXAMPLES

Test Methods

The test methods used to characterize the molding compositions are set out below:
Charpy notched impact resistance ($a_k$) [$kJ/m^2$]:
Charpy notched impact resistance ($a_k$) was determined on specimens produced at a melt temperature of 250° C., to ISO 179 1eA, at 23° C.
Rainbow-Effect Light-Scattering
Assessment to determine the extent of rainbow effect used a disk of diameter 60 mm and thickness 2 mm, produced at 250° C. The disk was observed in daylight at an angle of 45° C. by 3 personnel, independently of each other, and was evaluated on the following scale:
0=no regular pattern discernible
1=first slight regular stripe pattern discernible
2=as 1, but somewhat more distinct
3=clearly visible rainbow pattern.

Starting Materials

Components, molding compositions, or examples with "comp." prefix are not inventive and serve for comparison.

Components A Used Comprised:

A-i: An SAN produced by the solution polymerization process from 67% by weight of styrene and 33% by weight of acrylonitrile with an intrinsic viscosity IV of 80 ml/g (measured in 0.5% strength toluene solution at room temperature).

Components B Used Comprised:

B-i: acrylate graft rubber produced as in EP 450485 B1, page 7, line 14, with average particle size 100 nm.

B-ii: acrylate graft rubber produced as in DE 3149358 A1, page 15, line 12, with average particle size 220 nm.

acrylate graft rubber produced as in EP 450485 B1, page 7, line 14, with average particle size 100 nm, but with an S/AN ratio of 80/20 in the graft shell.

B-iv: acrylate graft rubber produced as in EP 450485 B1, page 7, line 14, with average particle size 100 nm, but with an S/AN ratio of 70/30 in the graft shell.

C-i: acrylate graft rubber produced as in EP 450485 B1, page 7, line 28 with average particle size 410 nm.

D-i: Carbon black marketed as Black Pearls 880 by Cabot.

Production of Molding Compositions and Moldings:

Components (A)-(D) (for respective parts by weight, see tables 1 and 2) were homogenized at 250° C. in a ZSK30 twin-screw extruder from Werner & Pfleiderer, and extruded and pelletized. Test specimens were produced from the pellets, and the properties mentioned in tables 1 and 2 were determined.

TABLE

Constitution and properties of molding compositons (comp: for comparison)

| Example | comp 1 | comp 2 | comp 3 | comp 4 | 5 | 6 | 7 | comp 8 | comp 9 |
|---|---|---|---|---|---|---|---|---|---|
| A-i [% by wt.] | 59.5 | 59.5 | 59.5 | 59.5 | 59.5 | 59.5 | 59.5 | 59.5 | 59.5 |
| B-i [% by wt.] | | 40 | | 35 | 30 | 25 | 20 | 15 | 10 |
| B-ii [% by wt.] | | | 40 | | | | | | |
| B-iii [% by wt.] | | | | | | | | | |
| B-iv [% by wt.] | | | | | | | | | |
| C-i [% by wt.] | 40 | | | 5 | 10 | 15 | 20 | 25 | 30 |
| D-i.. [% by wt.] | 0.5 | 0.5 | 0.5 | 0.5 | 0.5 | 0.5 | 0.5 | 0.5 | 0.5 |
| Properties ak (kJ/m$^2$) | 21 | 6 | 24 | 44 | 56 | 59 | 62 | 60 | 57 |
| Rainbow effect | 3 | 0 | 0 | 0 | 0 | 0 | 0 | 1 | 1 |
| MVR (220/10) in Ml/10 min | 4.1 | 2.2 | 4.1 | 2.3 | 2.9 | 2.2 | 2.9 | 3.3 | 3.2 |

* lower values mean better appearance; scale: 3: severe, 2: moderate, 1: slight, 0: very slight
** could not be determined, since flowability too low
A-i S/AN 67/33 - VZ 80
B-i Acrylate graft rubber as in EP 450485 B1, p. 7, line14 - 100 nm
B-ii Acrylate graft rubber as in DE 3149358 A1, p. 15, line 121, p. 7, line 14 - 220 nm
B-iii Acrylate graft rubber as in EP 450485 B1, p. 7, line 14 - 100 nm, S/AN 80/20
B-iv Acrylate graft rubber as in EP 450485 B1, p. 7, line 14 - 100 nm, S/AN 70/30
C-i Acrylate graft rubber as in EP 450485 B1, p. 7, line 28 - 410 nm
D-i Black Pearls 880 carbon black masterbatch, Cabot

TABLE

Constitution and properties of molding compositons (comp: for comparison)

| Example | 10 | 11 | 12 | 13 | comp 14 | comp 15 | comp 16 | comp 17 | comp 18 | comp 19 |
|---|---|---|---|---|---|---|---|---|---|---|
| A-i [% by wt.] | 59.5 | 59.5 | 59.5 | 59.5 | 59.5 | 59.5 | 59.5 | 59.5 | 59.5 | 59.5 |
| B-i [% by wt.] | | | | | | | | | | |
| B-ii [% by wt.] | 30 | 25 | 20 | 15 | | | | | | |
| B-iii [% by wt.] | | | | | 30 | 25 | 20 | | | |
| B-iv [% by wt.] | | | | | | | | 30 | 25 | 20 |
| C-i [% by wt.] | 10 | 15 | 20 | 25 | 10 | 15 | 20 | 10 | 15 | 20 |
| D-i.. [% by wt.] | 0.5 | 0.5 | 0.5 | 0.5 | 0.5 | 0.5 | 0.5 | 0.5 | 0.5 | 0.5 |
| Properties ak (kJ/m$^2$) | 38 | 31 | 29 | 31 | 23 | 21 | 21 | 22 | 42 | 50 |
| Rainbow effect | 0 | 0 | 0-1 | 0-1 | 0 | 0-1 | 0-1 | 0 | 0-1 | 0-1 |
| MVR (220/10) in Ml/10 min | 4.2 | 4 | 4.3 | 3.9 | 4.1 | 4.8 | 5 | nd** | nd** | 2.1 |

*lower values mean better appearance; scale: 3: severe, 2: moderate, 1: slight, 0: very slight
**could not be determined, since flowability too low
A-i S/AN 67/33 - VZ 80
B-i Acrylate graft rubber as in EP 450485 B1, p. 7, line 14 - 100 nm
B-ii Acrylate graft rubber as in DE 3149358 A1, p. 15, line 121, p. 7, line 14 - 220 nm
B-iii Acrylate graft rubber as in EP 450485 B1, p. 7, line 14 - 100 nm, S/AN 80/20
B-iv Acrylate graft rubber as in EP 450485 B1, p. 7, line 14 - 100 nm, S/AN 70/30
C-i Acrylate graft rubber as in EP 450485 B1, p. 7, line 28 - 410 nm
D-i Black Pearls 880 carbon black masterbatch, Cabot The examples provide evidence that when the molding compositions of the invention are compared with known molding compositions they have better impact resistance and on coloration, specifically with opaque colors, preferably with dark color shades, they exhibit reduced light-scattering, in particular no rainbow effect at all.

The invention claimed is:

1. A molding composition comprising
   (A) from 50 to 70% by weight of a copolymer comprising, as main units, at least one α,β-unsaturated monocarbonitrile in amounts of at least 30% by weight, based on the total weight of component (A), and at least one aromatic vinyl monomer, as component (A),
   (B) from 20 to 30% by weight of a graft rubber with an average particle size of from 100 to 280 nm, comprising a graft base b1, composed of at least one α,β-unsaturated monocarboxylic ester, and at least one graft shell b2, composed of at least one aromatic vinyl monomer and of at least one α,β-unsaturated monocarbonitrile, as component (B),
   (C) from 10 to 20% by weight of a graft rubber with an average particle size of from 410 to 1000 nm, comprising a graft base c1, composed of at least one α,β-unsaturated monocarboxylic ester, and at least one graft shell c2, composed of at least one aromatic vinyl polymer and of at least one α,β-unsaturated monocarbonitrile, as component (C), and
   (D) from 0 to 10% by weight of additives, as component (D),
   where the entirety of the amounts of components (A), (B), (C), and (D) is 100% by weight,
   wherein
   the ratio by weight of component (B) to component (C) is in the range from 3:1 to 1:1, and
   the content of the α,β-unsaturated monocarbonitrile in component (B), in % by weight based on the total weight of the graft shell b2, and in component (C), in % by weight based on the total weight of the graft shell c2, is in each case from 5 to 10 percentage points below the content of α,β-unsaturated monocarbonitrile in component (A), in % by weight based on the total weight of component (A).

2. The molding composition according to claim 1, wherein the particle size of the graft rubbers, averaged over all of the graft rubbers (B) and (C), is in the range from 280 to 320 nm.

3. The molding composition according to claim 1, wherein component (A) comprises acrylonitrile as α,β-unsaturated monocarbonitrile, and styrene and/or α-methylstyrene as aromatic vinyl monomer.

4. The molding composition according to claim 2, wherein component (A) comprises acrylonitrile as α,β-unsaturated monocarbonitrile, and styrene and/or α-methylstyrene as aromatic vinyl monomer.

5. The molding composition according to claim 1, wherein, in components (B) and (C), the α,β-unsaturated monocarboxylic ester is an alkyl acrylate or alkyl methacrylate respectively derived from an alcohol having from 1 to 8 carbon atoms.

6. The molding composition according to claim 1, wherein, in components (B) and (C), the aromatic vinyl monomer is styrene.

7. The molding composition according to claim 4, wherein, in components (B) and (C), the aromatic vinyl monomer is styrene.

8. The molding composition according to claim 1, wherein, in components (B) and (C), the α,β-unsaturated monocarbonitrile is acrylonitrile.

9. The molding composition according to claim 4, wherein, in components (B) and (C), the α,β-unsaturated monocarbonitrile is acrylonitrile.

10. A process for producing the molding composition according to claim 1, which comprises mixing, in the melt, components (A), (B), (C), and, if present, (D).

11. A foil, a molding, or a fiber, comprising the molding composition according to claim 1.

12. A process for producing foils, moldings, or fibers which comprises processing the molding composition according to claim 1.

13. The process according to claim 12 which comprises thermoforming, extruding, injection-molding, calendering, blow molding, pressing, or pressure-sintering the molding composition according to claim 10.

* * * * *